United States Patent [19]

Ackerfeldt et al.

[11] 4,142,736
[45] Mar. 6, 1979

[54] GOLF CART

[75] Inventors: Bo I. Ackerfeldt, Ascona, Switzerland; Curt Olsson, Bandhagen; Carl-Göran Crafoord, Bromma, both of Sweden

[73] Assignee: Sikob Svensk Industris Konstruktions-Och Berakningskontor AB, Sollentuna, Sweden

[21] Appl. No.: 739,534

[22] Filed: Nov. 3, 1976

[51] Int. Cl.$^2$ ............................................. B62D 11/00
[52] U.S. Cl. ............................ 280/652; 280/DIG. 6
[58] Field of Search ............. 280/47.24, 40, 42, 652, 280/654, 655, DIG. 6; 150/1.5 B

[56] References Cited

U.S. PATENT DOCUMENTS

| 1,628,771 | 5/1927 | Frisk | 150/1.5 B X |
| 2,699,951 | 1/1955 | Gans | 280/DIG. 6 |
| 2,837,346 | 6/1958 | Chambless | 150/1.5 B X |
| 2,885,215 | 5/1959 | Williamson | 280/DIG. 6 |
| 3,735,997 | 5/1973 | Seibold | 280/DIG. 6 |

*Primary Examiner*—Joseph F. Peters, Jr.
*Assistant Examiner*—R. Schrecengost
*Attorney, Agent, or Firm*—Haseltine, Lake & Waters

[57] ABSTRACT

A golf cart comprising a supporting chassis assembly and a wheel assembly with two, preferably foldable wheel struts connected to the chassis assembly. The chassis assembly is provided with a mounting assembly for mounting two separate golf bags in an individually detachable manner on the chassis assembly, the golf bags being each of a size suitable for accommodating half a normal set of golf clubs. The two golf bags are detachably mounted on opposite sides of a center beam member in the chassis assembly substantially in the same plane as and substantially parallel to the center beam member.

11 Claims, 7 Drawing Figures

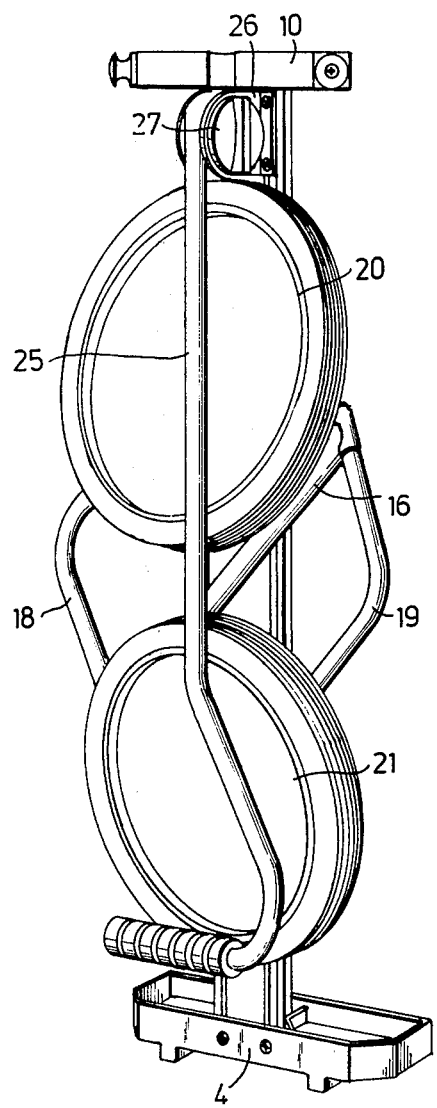

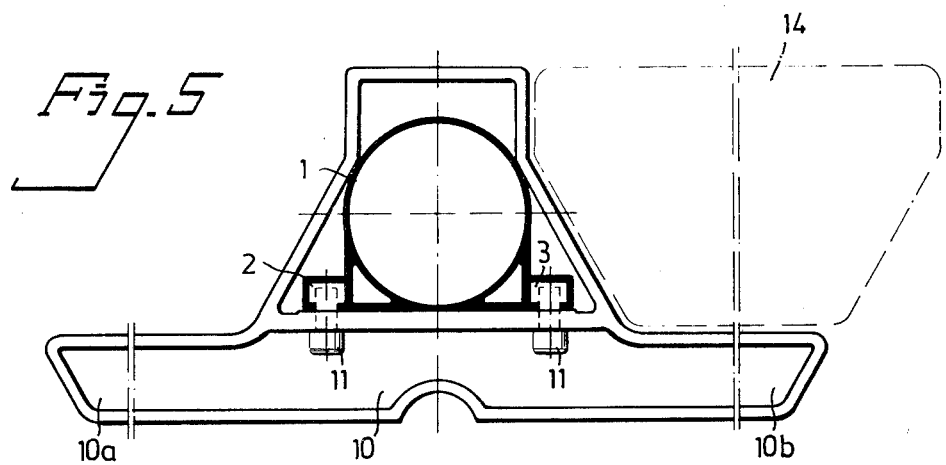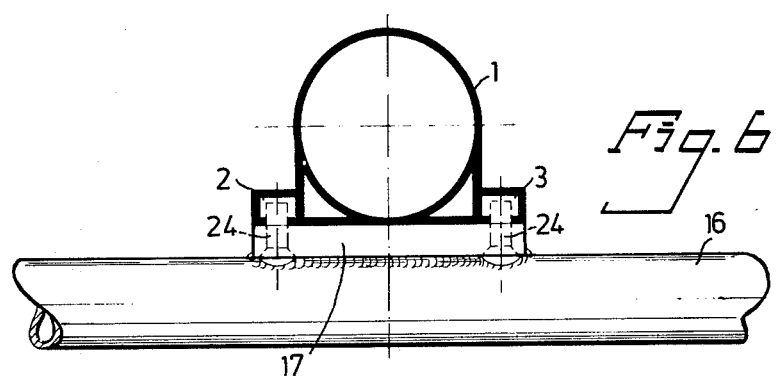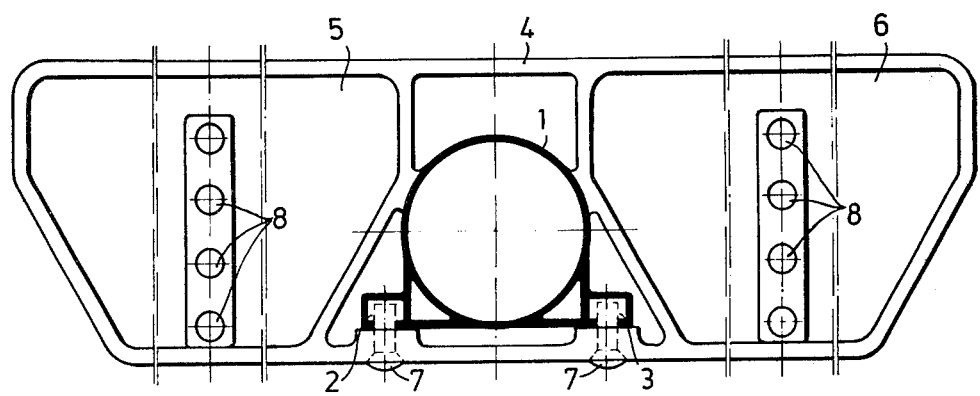

GOLF CART

FIELD OF INVENTION

The present invention relates to a golf cart. The most common type of golf carts comprises a supporting frame or chassis assembly, on which a golf bag can be detachably mounted, and a running gear or wheel assembly with two wheel struts connected to said chassis assembly. The wheel assembly is generally of such a design that the wheel struts can be pivoted from an erected running position, when the cart is to be used, and a folded position providing smaller total dimensions for the cart, which is advantageous when storing and transporting the cart.

PRIOR ART

As well known, a golf bag consists traditionally of a high, and as compared to its height relatively narrow bag or container having a bottom at its lower end but being open at its upper end. In this bag or container the golf clubs can be inserted with the shafts so that substantially only the heads of the clubs protrude from the bag at its upper open end. Generally, the bag is also provided with one or several outer pockets for holding balls, tees, rainwear and extra clothes and any other accessories that the player may want to bring along when playing. Such a golf bag is actually intended to be carried by hand by the aid of a handle mounted on the bag or over the shoulder by means of a shoulder strap attached to the bag. However, a golf bag of this type intended to hold a complete set of clubs, i.e., up to 14 clubs according to the rules of the game, becomes comparatively large and heavy, in particular when it is filled with a complete set of clubs and all other equipment the player may wish to bring along. In order to make it easier for the golfer and to avoid the need of a caddy, golf carts of the kind described in the foregoing have been designed, on which a golf bag holding the required clubs and all other equipment can be strapped and which can be hauled by the golfer on the course.

However, there are situations when it is not possible to use such a golf cart. This is the case for instance in some countries, where during certain seasons it is not permitted to use carts on the courses, as the ground is so wet and soft that carts may damage the course. Further, when travelling it may be difficult or impossible to bring along also a golf cart, wherefore when playing on courses visited during a voyage the golfer will have to carry his bag, unless it is possible to rent a cart. As mentioned above, however, it is both uncomfortable and strenuous and for many golfers in fact impossible to carry a large golf bag intended for a complete set of clubs for a complete gold round of 18 holes. Therefore, many golfers are forced to buy, in addition to such a large golf bag intended for a complete set of clubs, also a smaller bag which certainly can hold only a smaller number of clubs, for instance half a set, but which the golfer can easily carry on the course when it is not possible to use a cart and which is also much easier to bring along when travelling. The golfer is consequently forced to buy both a large and comparatively expensive bag to be used together with a golf cart and a smaller bag to be used without a cart, which increases his total costs for the game. A similar situation arises for youngsters and other beginners, who often, i.e., for economic reasons start by buying a small number of clubs, for instance 5 to 7, and a golf bag suitable for this number of clubs and in which the clubs can be carried during play. When such a golfer eventually acquires more clubs, it will also be necessary for him to acquire simultaneously and at comparatively considerable costs a correspondingly large golf bag.

SUMMARY OF INVENTION

An object of the present invention is therefore to provide a golf cart of the general type described in the foregoing but of a novel design which provides a practically and economically satisfactory solution of the problems discussed above.

According to the invention this is achieved in that the supporting chassis assembly of the cart is provided with means for individually and detachably mounting two separate golf bags on the chassis assembly, each bag being of a size suitable for accommodating half a normal set of golf clubs.

With a golf cart according to the invention each of the two bags which can be detachably mounted on the cart, can consequently be a comparatively small, light and inexpensive bag holding only half a set of clubs. With both bags mounted on the cart the golfer can in a normal manner bring along a complete set of clubs and all other equipment and accessories that may be needed. However, it is also possible to detach one of the two bags from the cart and use this bag as a light and comparatively small carrier or travel bag for half a set of clubs. Thus, it is no longer necessary to acquire both a large and expensive bag for a complete set of clubs and a special carrier and travel bag. Also for the beginner the golf cart according to the invention is advantageous, as the golfer can start by buying only half a set of clubs and a small bag intended for this number of clubs and at a later time, when he has acquired more clubs, buy a second similar small bag and a cart according to the invention, on which both bags can be mounted. Further, a golf cart according to the invention can of course also be used with only a single bag mounted on the cart, if the golfer should want to acquire a cart before he has acquired a complete set of clubs.

The golfing equipment consisting of a cart according to the invention, a complete set of clubs and two bags for half a set of clubs each has also the additional advantage that it can be used by two players, for instance the owner and a temporary guest, in that one of the players uses the cart with one of the bags attached thereto and containing half the club set, whereas the second player carries the second bag with the remaining clubs.

A golf cart according to the invention has also the advantage that it will be easier to keep the clubs in order, as they are disposed in two separate bags attached to the cart.

BRIEF DESCRIPTION OF THE DRAWINGS

In the following the invention will be further described with reference to the accompanying drawings, which illustrate by way of example a preferred embodiment of the golf cart according to the invention. In the drawings

FIG. 4 is a perspective view of the cart as seen from the underside, with the wheel struts in their folded positions and without any bags attached to the cart; and FIGS. 5, 6, and 7 are cross-sections through the cart taken along lines V—V, VI—VI, and VII—VII respectively in FIG. 1.

DETAILED DESCRIPTION

Figure 1:
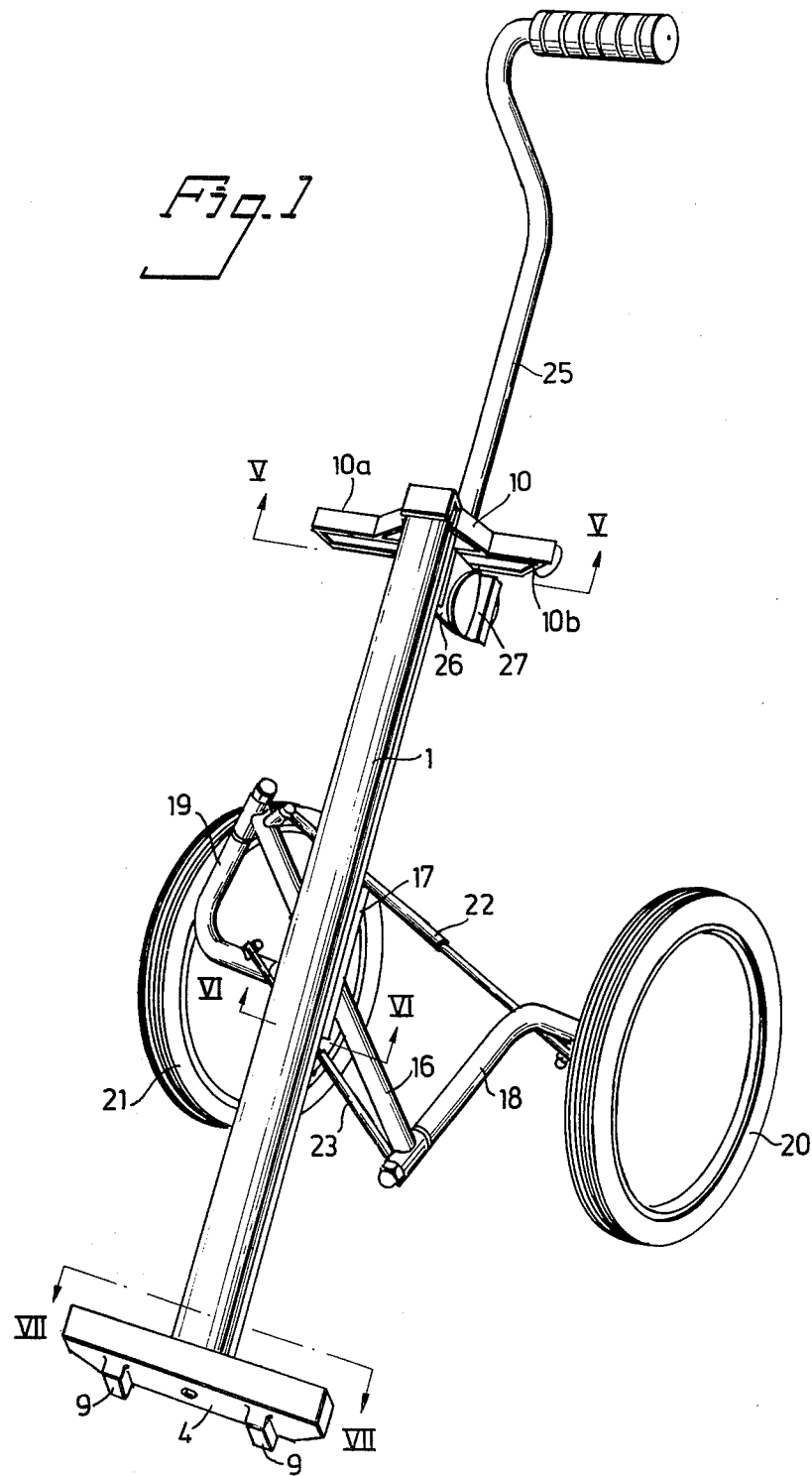
FIG. 1 is a perspective view of the cart as seen from the rear, with the wheel struts in their erected running position and without any bags mounted on the cart.

The golf cart according to the invention as shown by way of example in the drawings comprises in conventional manner a supporting frame or chassis assembly and a running gear or wheel assembly with two wheel struts connected to said frame or chassis assembly. The supporting chassis assembly includes a supporting center beam or shaft 1 extending in the longitudinal direction of the cart, which coincides with the intended running direction of the cart. As can be most readily seen in FIGS. 5 to 7, this center beam 1 is preferably tubular and provided with two parallel grooves 2 and 3 extending over the entire length of the beam. The purpose of these grooves will be described in further detail in the following. The tubular beam may preferably consist of a cut-off length of an extruded metal tube with the desired cross-section profile.

At its lower end the center beam 1 supports a bottom or rear plate 4 which is substantially perpendicular to the longitudinal direction of the center beam 1. On its upper side, which is facing forwards towards the upper end of the center beam 1, the bottom plate 4 is provided with two trough-shaped recesses 5 and 6 located symmetrically on opposite sides of the center beam 1 and having a shape suitable for receiving the lower end of one golf bag 14, 15 each. As can be most readily seen in FIG. 7, the bottom plate 4 is attached to the center tube 1 by bolts 7 cooperating with nuts positioned in the grooves 2 and 3 on the center tube 1. The trough-shaped recesses 5 and 6 in the bottom plate 4 are preferably provided with drainage openings 8 preventing water from collecting in the recesses. The lower side of the bottom plate 4 may be provided with a pair of bosses or feets 9, on which the cart can be supported in a vertical upright position, as illustrated in FIG. 4.

At its upper or fore end the tubular center beam 1 is provided with a bracket member 10 having two cantilever bracket arms 10a and 10b which project perpendicularly from the center beam 1 on opposite sides thereof. The bracket arms are shaped to support one golf bag 14, 15 each at the upper end of the bag. As most readily seen in FIG. 5, the bracket member 10 is attached to the center beam 1 in a manner similar to the bottom plate 4, i.e., by means of bolts 11 cooperating with nuts positioned in the grooves 2 and 3 on the center beam 1. The bracket member 10 is also provided with two straps 12 and 13, for instance rubber straps, which can be used for strapping the upper ends of a golf bag to the bracket arm 10a and 10b respectively.

Figure 2:
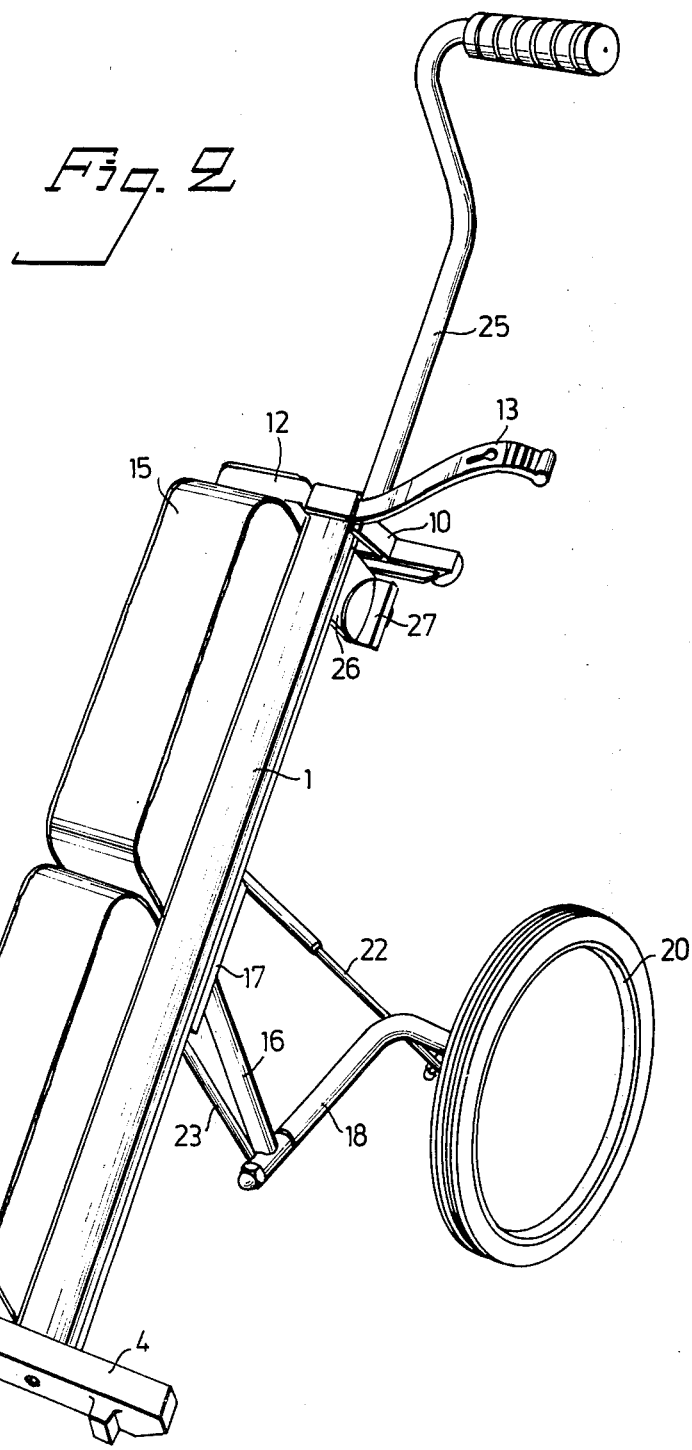
FIG. 2 is a similar perspective view of the cart as in FIG. 1, but with one bag mounted on the cart.
Figure 3:
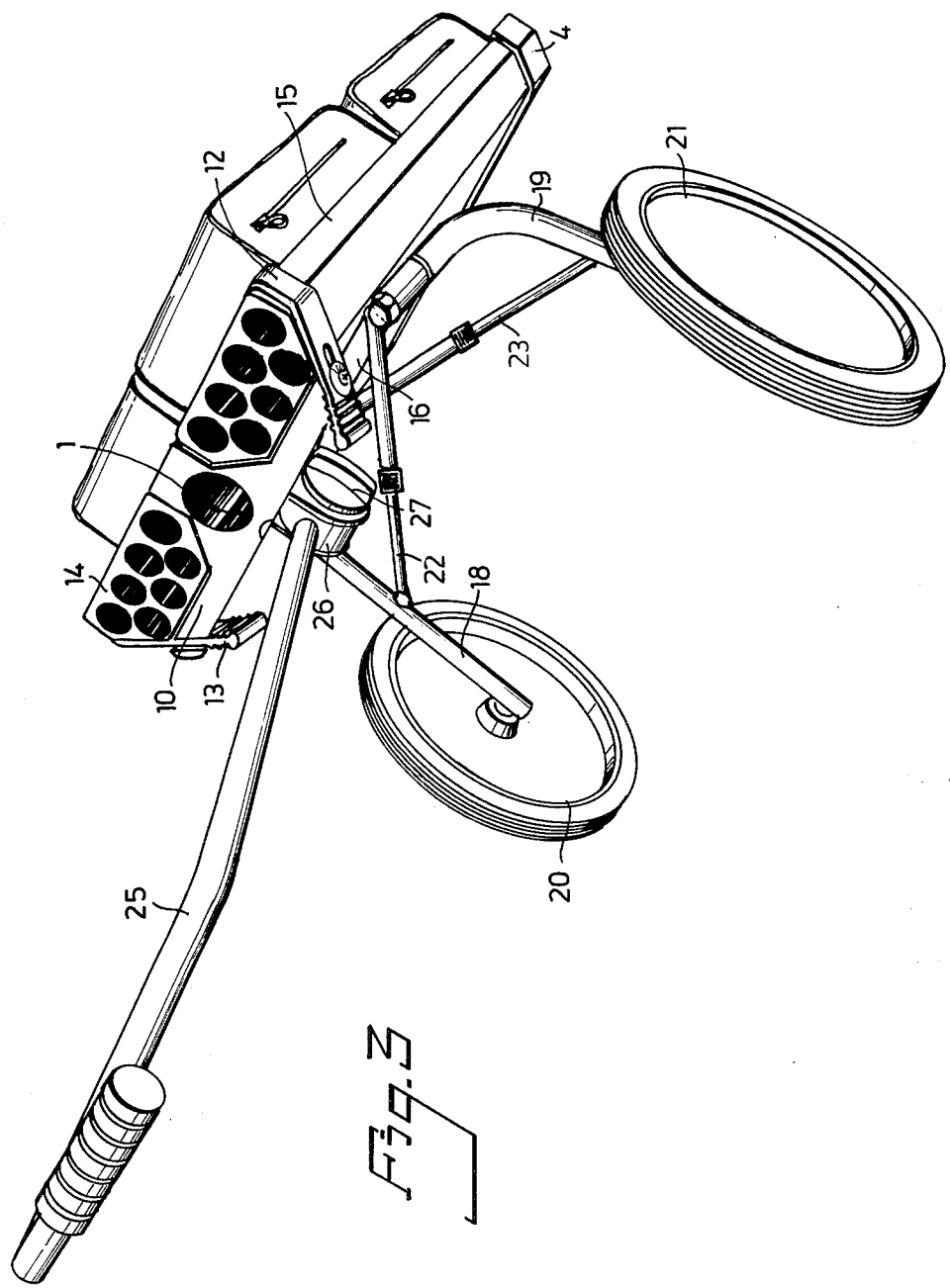
FIG. 3 is a perspective view of the cart as seen from the front, with the wheel struts in their running position and with two golf bags strapped to the cart.

As will be appreciated from the foregoing and as clearly illustrated in FIGS. 2 and 3, it is possible on the supporting chassis assembly of the illustrated golf cart according to the invention to mount two separate golf bags 14 and 15 in an individually detachable manner, in that the lower ends of the bags are inserted in the trough-shaped recesses 5 and 6 in the bottom plate 4, whereas the upper ends of the bags are rested against the bracket arms 10a and 10b at the upper end of the center beam 1 and strapped to these bracket arms by means of the straps 12 and 13. In this way both bags will be efficiently secured to the chassis assembly of the cart parallel to each other and on opposite sides of the tubular center beam 1.

The upper end of the tubular center beam 1 may preferably be open, as can be seen in FIG. 3, and the inner diameter of the center tube may be such that the tube can be used as a holder for a golf umbrella.

The running gear or wheel assembly of the cart includes a tubular cross beam 16 which has its middle-portion welded to a mounting plate 17 and at the opposite terminal ends of which the two wheel struts 18 and 19 are pivoted. At their opposite ends the wheel struts 18 and 19 support the running wheels 20 and 21 of the cart. The pivot axes of the wheel struts 18 and 19 at the terminal ends of the cross beam 16 are orientated in the manner described in the U.S. Pat. No. 3,985,372. Consequently, the wheel struts 18 and 19 with the wheels 20 and 21 can be folded from the running position illustrated in FIGS. 1, 2, and 3 to the folded position illustrated in FIG. 4, in which the wheels 20 and 21 are positioned close to the center beam 1 on opposite sides of the cross beam 16 and substantially in a common plane. It will be appreciated that in this folded position the wheel struts and the wheels occupy a very small space. It should also be noticed that the folding of the wheel struts and the wheels can take place without hindrance of two golf bags strapped to the cart, although this is not illustrated in FIG. 4. The wheel struts 18 and 19 are locked in their erected running positions by means of two telescopic struts 22 and 23 which can be latched in their extracted position in a suitable manner, for instance by means of snap latches.

The wheel assembly is connected to the center beam 1 of the chassis assembly by means of the mounting plate 17 welded to the cross beam 16, in the manner illustrated in FIG. 6. Thus, the mounting plate 17 is attached to the center beam 1 by means of bolts 24 cooperating with nuts positioned in the grooves 2 and 3 on the center beam 1. As these nuts can be moved along the grooves 2 and 3, the point of connection for the mounting plate 17 and thus for the entire wheel assembly can be displaced along the center beam 1. This is very advantageous, as this point of connection forms a balance point for the cart when being hauled, wherefore it may be advantageous that the location of this balance point can be adjusted dependent on the height of the user and also dependent on the weight of the golf bags with inserted clubs mounted on the cart. This is particularly important in connection with the golf cart according to the invention, which is intended to be used alternatively with one or two bags strapped to the cart. As the major portion of the weight of a golf club is concentrated to the head of the club, the total point of gravity for the cart with attached golf bags and clubs will change its position considerably dependent on whether only one bag or two bags are mounted on the cart.

Although the golf cart according to the invention illustrated by way of example in the drawings is provided with a foldable wheel assembly of the design disclosed in the U.S. Pat. No. 3,985,372, it is obvious that a golf cart according to the invention may also be provided with other types of wheel assemblies.

Further, in the usual way the cart is provided with a handle 25 having its rear end connected to a bracket 26 through a lockable pivot joint 27. The bracket 26 for the handle 25 is connected to the upper end of the center beam 1 underneath the bracket member 10 in a manner similar to that described in the foregoing for the connection of the bottom plate 4, the bracket member 10 and the mounting plate 17 of the wheel assembly. The handle 25 can be pivoted at the joint 27 from the protruding running position shown in FIGS. 2, 3, and 4 to the folded position shown in FIG. 5. In this folded position the handle is positioned on the outside and close to the folded wheels 20 and 21. As the handle can be locked in this folded position, as well as in any other position, by tightening of the pivot joint 27, the handle 25 will in this folded position retain the wheels and the wheel struts in their folded position.

Although the golf cart according to the invention which has been illustrated in the drawings and described above by way of example, is designed to fit a special type of golf bags, which is described in more details in U.S. patent application No. 739,536, it is obvious that a golf cart according to the invention can be designed to fit any type of golf bags, in that the bottom plate 4 and the bracket member 10 are given a corresponding suitable shape.

We claim:

1. A golf cart comprising a supporting chassis assembly including a supporting center beam extending in the intended running direction of the cart, a wheel assembly including two wheel struts, said wheel assembly being rigidly attached to said center beam, and mounting means rigidly attached to said center beam for mounting individually and detachably two separate, self-contained golf bags, each having a size suitable for accommodating half a normal set of golf clubs, on opposite sides of said center beam substantially in the same plane as and substantially parallel to said center beam, said mounting means including a rigid bottom plate rigidly supported at the rear end of said center beam, as seen in the running direction of the cart, so as to be substantially perpendicular to the longitudinal direction of said center beam, the side surface of said bottom plate facing the fore end of said center beam being provided with two trough-shaped recesses located on opposite sides of said center beam and shaped for slidably and detachably receiving the lower end of one golf bag each.

2. A golf cart is claimed in claim 1, wherein said mounting means includes additionally a rigid bracket member rigidly supported at the fore end of said center beam, said bracket member having two cantilever support arms extending perpendicularly and in opposite directions from said center beam for supporting one golf bag each at the upper end of the bag.

3. A golf cart as claimed in claim 2, wherein said bracket member is provided with two straps for strapping said golf bags to said cantilever support arms.

4. A golf cart as claimed in claim 1, wherein said wheel assembly is removably attached to said center beam.

5. A golf cart as claimed in claim 1, wherein the point on said center beam, where said wheel assembly is attached to the center beam, can be displaced along the center beam.

6. A golf cart as claimed in claim 1, wherein said wheel assembly includes a cross beam releasably attached to said center beam at the middle of the cross beam, said two wheel struts being pivotally attached to opposite terminal ends of said cross beam.

7. A golf cart comprising a supporting chassis assembly including a supporting center beam extending in the intended running direction of the cart, a wheel assembly including two wheel struts, said wheel assembly being rigidly attached to said center beam, and mounting means rigidly attached to said center beam for mounting individually and detachably two separate golf bags on opposite sides of said center beam, said mounting means including a rigid bottom plate rigidly supported at the rear end of said center beam, as seen in the running direction of the cart, so as to be substantially perpendicular to the longitudinal direction of said center beam, the side surface of said bottom plate facing the fore end of said center beam being provided with two trough-shaped recesses located on opposite sides of said center beam and shaped for slidably and detachably receiving the lower end of one golf bag each and a rigid bracket member rigidly supported at the fore end of said center beam, said bracket member having two cantilever support arms extending perpendicularly and in opposite directions from said center beam for supporting one golf bag each at the upper end of the bag.

8. A golf cart as claimed in claim 7, wherein said wheel assembly includes a cross beam releasably connected to said center beam at the center point of the cross beam, said two wheel struts being pivotally connected to opposite terminal ends of said cross beam.

9. A golf cart as claimed in claim 7 wherein said bracket members are shaped in conformance with the shape of the recesses on said bottom plate for slidable and detachable support of said golf bags.

10. A golf cart as claimed in claim 7, wherein said wheel assembly is removably connected to said center beam.

11. A golf cart as claimed in claim 7, wherein the point of connection of said wheel assembly to said center beam can be displaced along said center beam.

* * * * *